United States Patent [19]

Javan

[11] 4,435,808
[45] Mar. 6, 1984

[54] PRODUCTION OF RADIATION AT FREQUENCIES OF PRESELECTED ABSORBING RESONANCES AND METHODS USING SAME

[76] Inventor: Ali Javan, 12 Hawthorn St., Cambridge, Mass. 02139

[21] Appl. No.: 227,156

[22] Filed: Jan. 22, 1981

[51] Int. Cl.³ .......................................... H01S 3/113
[52] U.S. Cl. ...................... 372/11; 372/25; 372/19; 372/20; 372/93; 372/94; 372/26; 372/29; 372/102; 356/361
[58] Field of Search ............ 372/97, 94, 93, 98, 372/102, 11, 18–20, 26, 29, 84, 25; 356/345, 352, 361

[56] References Cited

U.S. PATENT DOCUMENTS

| | | | |
|---|---|---|---|
| 3,504,299 | 3/1970 | Fox | 372/97 |
| 3,539,262 | 11/1970 | Pryor | 356/361 |
| 3,614,655 | 10/1971 | Bolger | 372/26 |
| 3,855,544 | 12/1974 | Bowness | 372/97 |
| 4,302,730 | 11/1981 | Jernigan | 372/97 |

*Primary Examiner*—William L. Sikes
*Assistant Examiner*—Léon Scott, Jr.

[57] ABSTRACT

Radiation at the frequency of a preselected absorbing resonance is produced by use of split and recombined interfering optical paths, arranged to produce near white light interference effects, and a preselected absorption medium disposed in one path of the interfering configuration. By association of this configuration with a laser oscillator, the regeneration characteristic of the laser oscillation can be determined by a peak in the reflected or transmitted wave produced by the cooperation of the optical interference system and the absorption medium. Use with standing wave, ring, and gain-switched transient lasers all can produce radiation essentially confined to the narrow absorption profile of a selected gas. Improved methods of laser chemistry and remote and close range gas detection are made possible by the new system. The system is also useful as an extremely narrow filter for broader band light sources, or as an optical element for other purposes, such as for establishing high Q response for optical resonators of the standing wave or traveling wave, ring type.

14 Claims, 21 Drawing Figures $\Delta \nu = c/4(\ell_2 - \ell_1)$

RESONATOR MODES
WITHIN THE LINE PROFILE

RING LASER CONFIGURATION;
THE INTERFEROMETER USED
IN TRANSMISSION

RING LASER WITH A GRATING; THE
INTERFEROMETER USED IN TRANSMISSION

GAIN-SWITCHED
(TRANSIENT) LASER

UNIDIRECTIONAL SINGLE-
MODE OSCILLATION
AT A SELECTED FREQUENCY

SELECTS THE MODE
IN THE EARLY
BUILD-UP TIME

PRODUCTION OF RADIATION AT FREQUENCIES OF PRESELECTED ABSORBING RESONANCES AND METHODS USING SAME

BACKGROUND

Interaction of radiation with a molecular resonance has found a variety of uses in emerging industrial applications, especially when (but not limited to) using a laser as the radiation source. Such applications require that the laser be tunable in the region of selected molecular resonances. Moreover, the laser must operate stably and with a spectral spread less than the line-width of the selected resonance. Some applications demand high-intensity repetitively pulsed output at sizable average powers; others require low-power lasers capable of CW operation. The applications include laser chemistry, material purification, atmospheric remote sensing, trace gas detection, chemical process control, and others.

There are several types of tunable lasers with broad amplification bandwidth in the spectral regions of interest. Two problems are generally encountered:

(1) the free running lasers tend to operate at a multimode spectral output spread over a broad interval, often considerably exceeding the line width of the molecular resonance. It is necessary to eliminate the multi-moding for the applications under consideration.

(2) once single moding is achieved, the laser must be finely tuned to the frequency of a selected resonance, and maintained at that frequency over a long time period.

To review the situation we note that, e.g., a gain-switched (pulsed)$CO_2$ laser at a multi-atmospheric gas pressure offers broad amplification band-width. Frequency tuning can be achieved with a resonator employing a tunable grating. Such a laser, however, has a multi-mode spectral output generally spread over a 2000 MHz interval. A variety of important uses require a laser frequency spread below 20 or 50 MHz. Similarly, a grating tunable near UV-pulsed excimer laser, as in KrF or ArF lasers, has a multi-mode output, sizably exceeding the frequency spread of a $CO_2$ laser as described. A CW or pulsed dye laser with a simple grating resonator also operates at a spectral output spread over a broad region. The technology to extract the laser energy from such lasers at a finely controlled and pure frequency is a subject of considerable interest.

Elimination of laser multi-moding has been extensively scrutinized since the early days of lasers (the nineteen sixties). Several methods have been devised to achieve—with varying degrees of success—single mode operations at a tunable frequency. The recent efforts have been directed to high power repetitively pulsed lasers, operating at relatively high pulse energies.

Three principal methods have been devised to achieve single moding. One approach relies on operating the laser resonator at a wide mode spacing, so that when one of the modes is near the peak of the laser gain profile, the adjacent modes lie at sufficiently lower gains to allow the mode competition effect to inhibit multi-moding. In some cases a short laser resonator is used to obtain wide inter-order mode spacing. Other cases employ a compound resonator consisting of a short resonant structure coupled to a long laser resonator. In such cases considerable difficulties are encountered in seeking to achieve smooth tuning without a switch over to an adjacent mode. Such a mode-switching effect limits the frequency tuning to the vicinity of the maximum gain (or the peak of the grating response, if a resonator with a grating is used).

There have been other problems, e.g., a compound resonator requires difficult-to-achieve critical adjustments, unsuitable for use in a high power laser; a laser with a short resonator presents a small laser volume, unacceptable in cases where moderate or high laser energy is needed.

In another method, a short duration pulsed laser, operating in a transient regime, can be driven to oscillate at a single mode by means of transient regenerative amplification. A weak radiation field (obtained from an external tunable low-power laser), tuned to the frequency of a selected resonator mode of the pulsed (transient) laser, is introduced into the pulsed laser resonator. In that case, laser oscillation during transient build-up will occur at the selected single mode. Operation at a tunable frequency requires electronic control mechanisms to maintain coincidence of the selected resonator mode with the frequency of the driving (tunable) weak field. This approach has been successful and offers advantages where fine tuning is needed, e.g., high resolution probing of an absorption line-profile.

A third method, devised some time ago to obtain single-moding in a steady-state CW gas laser, utilizes the mode competition effect by employing an absorbing gas introduced in the laser resonator. The method relies on the nonlinearity of absorbing gas.

In most applications the tuning control is needed to bring the laser frequency to coincidence with an absorbing resonance belonging to molecules of interest (with which the laser radiation is to interact). Once the coincidence is achieved, the tuning control is kept at a fixed position, to maintain the coincidence over a long time duration. However, the reliance on a tuning control to achieve coincidence generally introduces frequency drifts caused by the tuning-mechanism drifts; this necessitates either frequent readjustments, or an automatic stabilization control.

In addition to other uses, as with broader band light sources, the invention described below makes it possible to extract laser energy at the frequency of an absorbing transition, without a need for broad tuning adjustment, as is necessary in a free running tunable laser. To illustrate, according to the invention there is provided an optical structure employed as a part of the laser resonator. The structure contains within it an absorption cell. To obtain laser operation at the frequency of an absorption resonance belonging to a gaseous medium, the user will introduce a quantity of the gas into the cell according to a simple prescription (dictating the pressure, and buffer gases where necessary). With that provision and a simple adjustment of the optical structure, the laser oscillation will occur within the line width of the selected absorption line. If the gas is removed from the absorption cell, the laser will cease oscillating; i.e., it will operate at the desired frequency, or there will be no laser oscillation. The invention is applicable regardless of the width of the absorbing resonance. The width can be the narrowest obtainable in the low pressure limit, corresponding to a Doppler broadened width. In important cases described below, the configuration employed will automatically eliminate laser multi-moding. Laser oscillation will occur on the single resonator mode nearest to the peak of the absorbing resonance.

MULTI-MODING IN CONVENTIONAL LASERS

In lasers employing the existing types of resonators, multi-moding occurs because the resonator offers a large number of equally spaced high-Q modes, spread over an extended frequency range; in a two-mirror resonator the extended range is the broad spectral region where the mirrors present high reflectance. A similar situation holds for lasers employing a tunable grating. In that case the equally spaced high-Q modes are spread over the broad width of the grating response. The mode spacings are generally in the radio-frequency region (of about hundreds of MHz). Multi-moding is a severe problem in lasers with broad amplification band widths. Such a broad bandwidth is needed to accommodate a sizable tuning of the laser frequency for a variety of applications.

The multi-moding and tuning problems will be resolved if a resonator is devised where, instead of a large number of equally spaced high-Q modes, only one or a few high-Q modes are present, and that these modes lie in a narrow frequency interval centered at a selected absorption resonance. Ideally the width of the interval accommodating the modes must be less than the absorption resonance line-width of the molecules of interest for interacting with the laser output. With the introduction of a broad-band laser amplifying medium in such a resonator, laser oscillation will occur on the modes lying within the widths of the absorption resonance. If the Q's of the few resonator modes lying within the given narrow interval happen to differ (even slightly) from one another, it will be possible to obtain single-mode oscillation on the resonator mode with the highest Q.

FEATURES OF THE INVENTION

According to one aspect, the invention comprises a laser oscillator having associated therewith an optical configuration defining interfering optical paths in which propagating rays are split and subsequently recombined to provide a transmitted and a reflected wave, an absorption medium located in one of said paths, said absorption medium including molecules having at least one absorption resonance with a characteristically narrow absorption profile in a region of desired laser oscillation, said optical paths being of substantially equal length to cause a near white light interference effect broadly in said region of interest, and the relative path lengths being so related that the optical configuration shows a narrow peak in one of said transmitted and reflected waves because of the presence of said absorption resonance, said laser oscillator adapted to have its regeneration characteristic determined by said wave having said peak, whereby laser oscillation can occur on a laser resonator mode lying within said absorption profile and whereby resonator modes lying outside of said profile are inhibited by destructive interference provided by said configuration.(An optical element for other uses can be constructed using the same configuration of interfering paths and absorption medium in one path).

In preferred embodiments of the invention, said optical configuration with said absorption medium is arranged to provide said narrow peak in said reflected wave, and said optical configuration is arranged to serve as a reflective element of the resonator of said laser oscillator; said optical configuration with said absorption media is arranged to provide said narrow peak in said transmitted wave and said optical configuration is arranged to serve as a transmitting element of the resonator of a ring laser oscillator; said optical configuration with said absorption medium is located external to the resonator of said laser oscillator and said wave with said peak is introduced into the resonator of said laser oscillator to cause laser oscillation to occur in said mode lying within said absorption profile, preferably said laser oscillator being a gain-switched ring laser system constructed to operate in transient regime and said optical configuration with said absorption medium is adapted to introduce said wave into said resonator during initial oscillation buildup time to cause oscillation to occur in a traveling wave in said mode lying within said absorption profile; the system of any of the above is combined with means to transmit the laser output to a space containing an absorbing gas having an absorption resonance corresponding to said peak; the system is in the form of a gas detection system including a detector means for detecting said laser output after interaction of said output with said absorbing gas, e.g., the system is combined with laser transmitter optics adapted to transmit said output to probe trace gases in a remote space and a receiver system adapted to receive a return signal after interaction of said output with said absorbing gas, preferably the system including means to periodically switch laser oscillation on and off the absorption resonance of said gas being detected to form a differential absorption lidar system; the space to which the laser output is transmitted is defined by a reactor vessel and said laser output is arranged to energize selected molecules in said reactor vessel to an excited state to provide a change in the molecular properties.

Another aspect of the invention concerns methods employing the foregoing system, for instance, employing said laser output to cause change in the molecular properties by photo dissociation of said molecules or employing said laser output to cause change in molecular properties in a manner to cause chemical reaction of energized molecules with other molecules present in a reactor.

DRAWINGS

Figure 3:
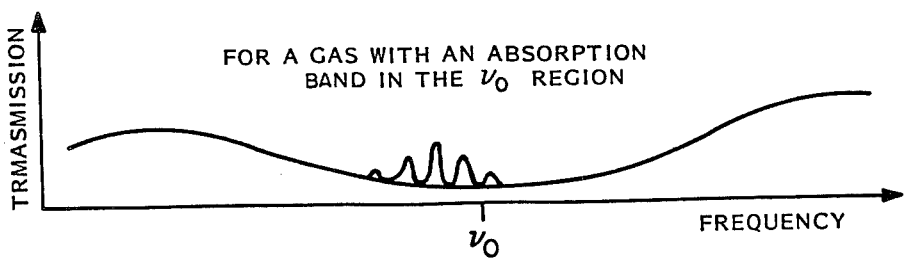
Figure 4:
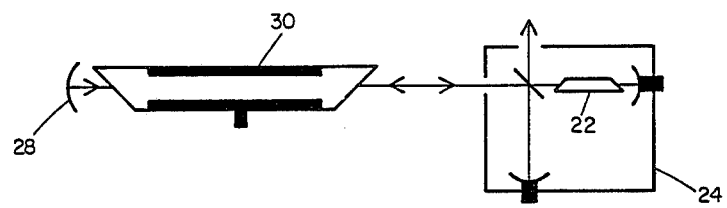
Figure 4A:
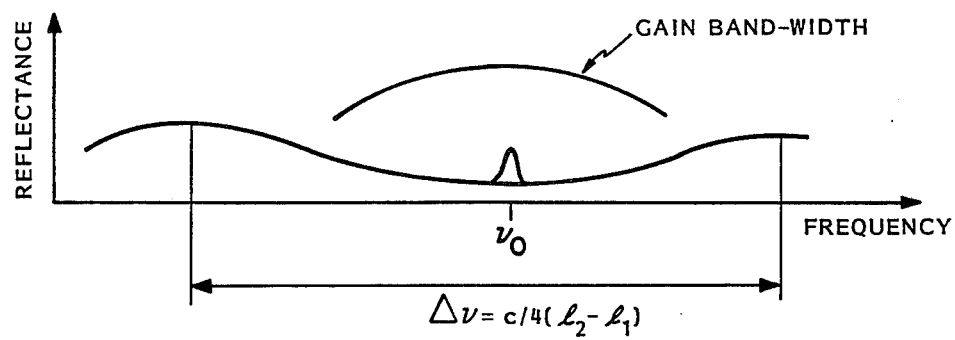
Figure 4B:
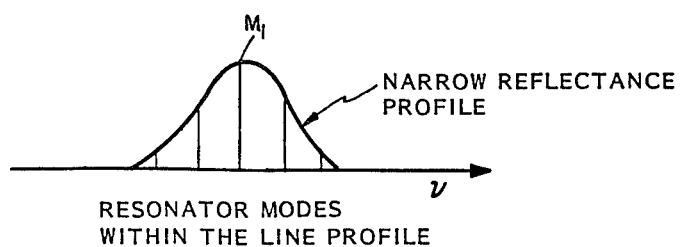
Figure 5:
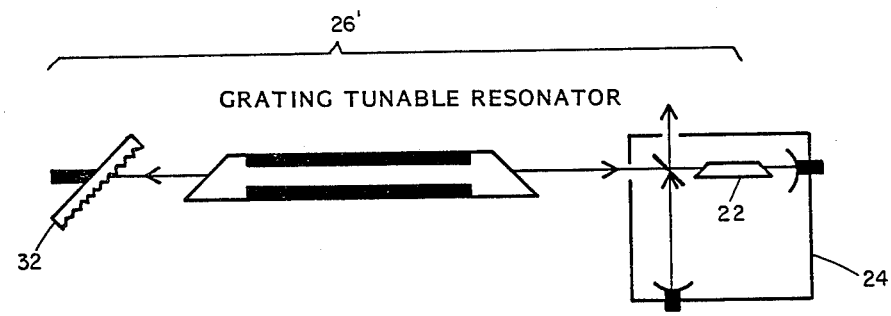
Figure 5A:
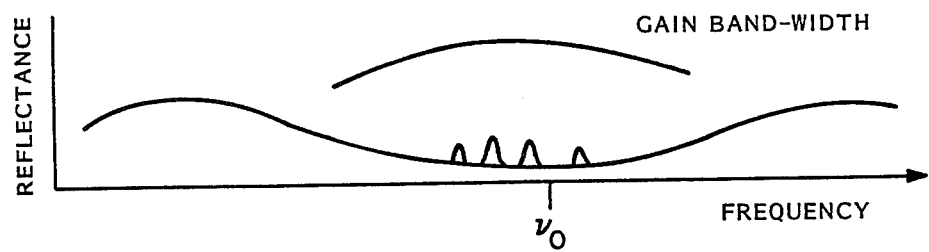
Figure 6:
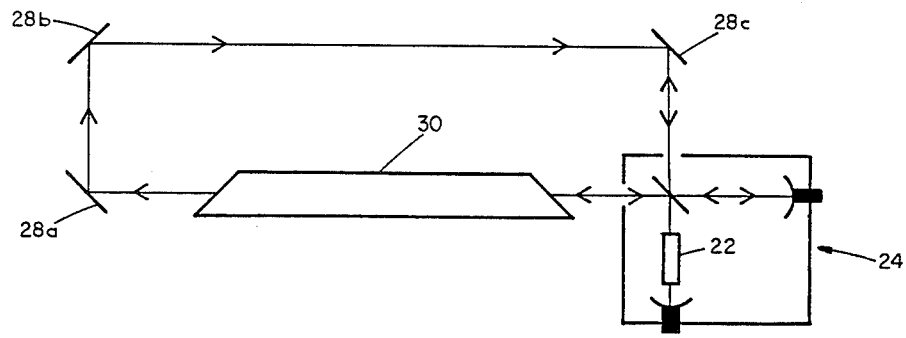
Figure 6A:
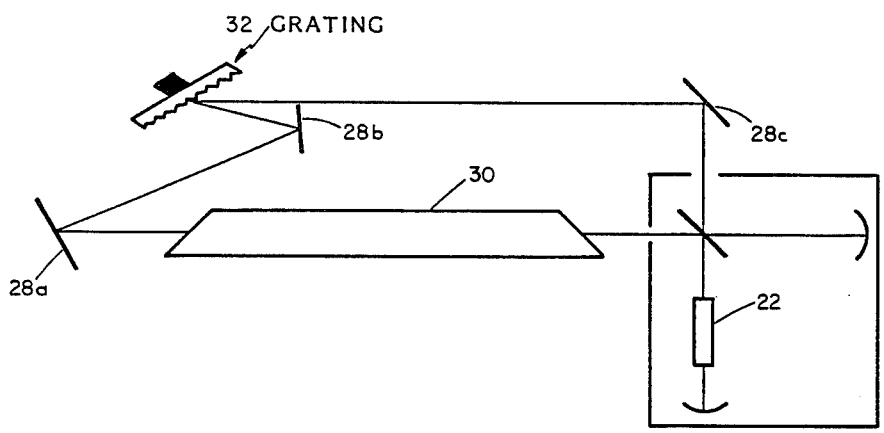
Figure 7:
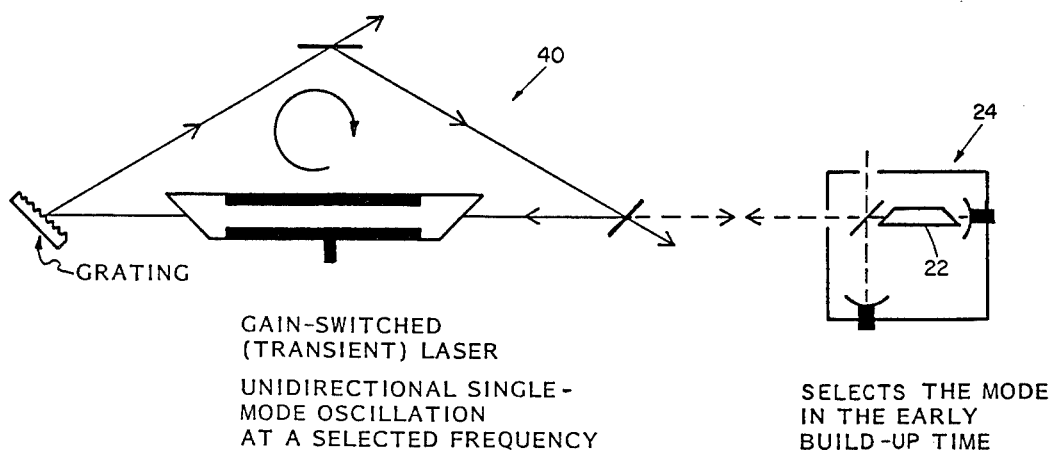
Figure 8:
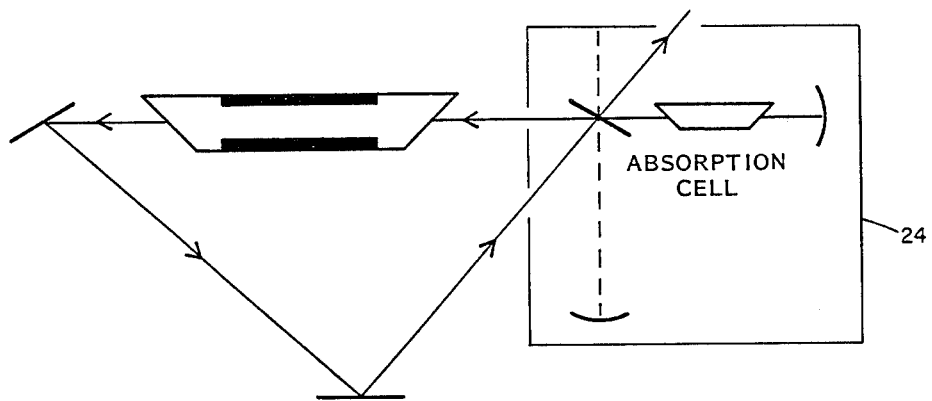
Figure 9:
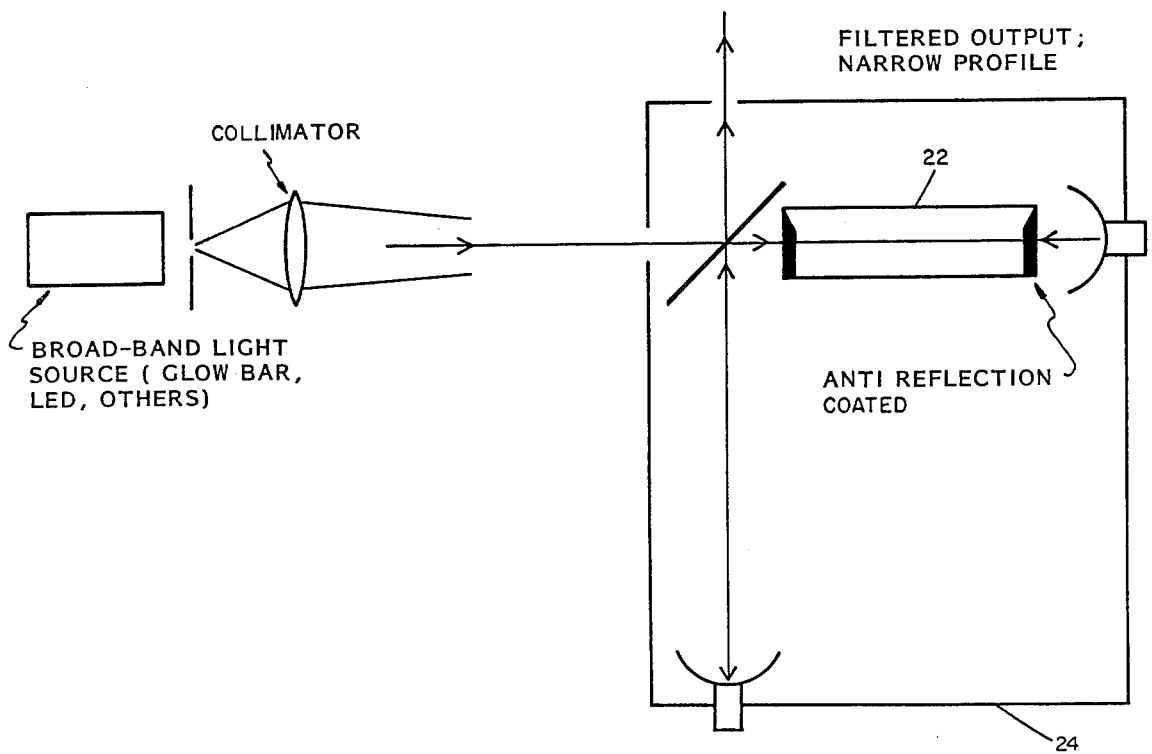
Figure 10:
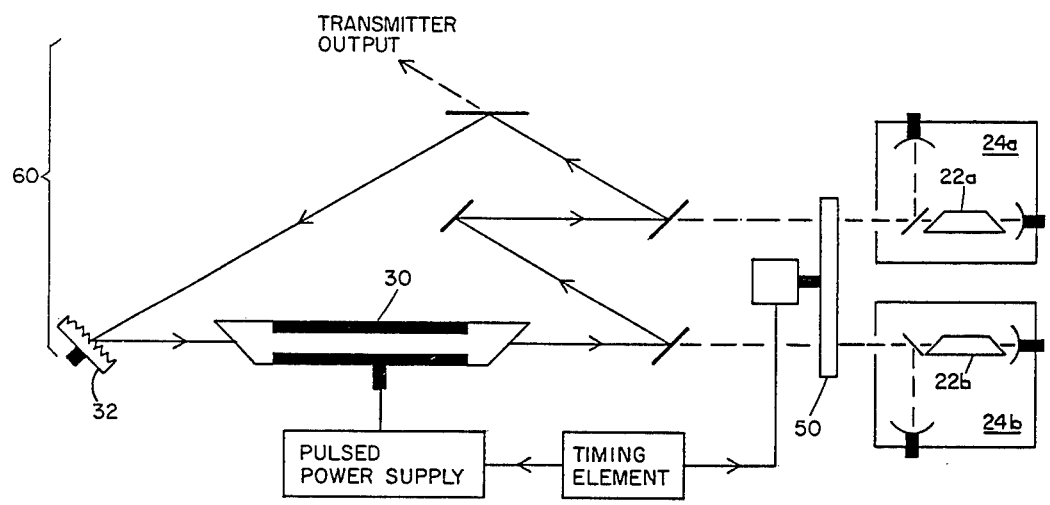
Figure 10A:
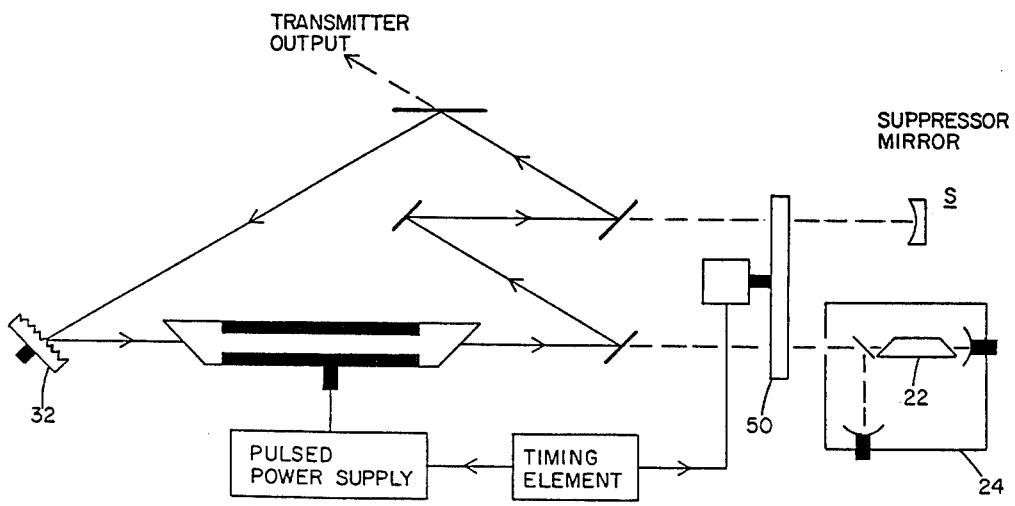
Figure 10B:
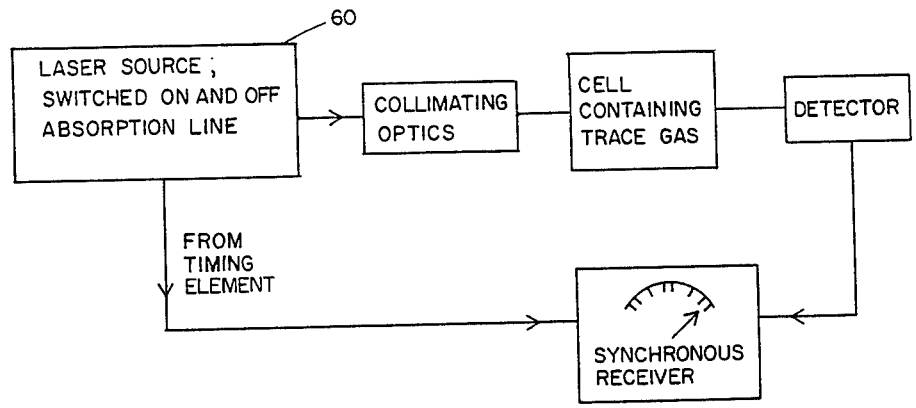
Figure 11:
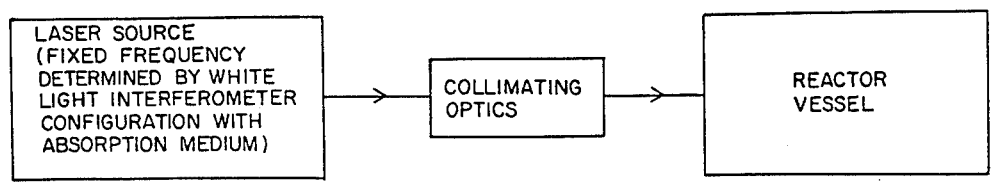

FIG. 3 refers to the configuration in which the interferometer arms are adjusted to show minimum transmission in the $\nu_o$ region. The presence of the absorbing gas causes narrow peak transmissions as shown;

FIG. 4 shows a laser in which the near white light interferometer with the absorption cell is used in place of one of the laser resonator mirrors;

FIG. 4a shows the response of the near white light interferometer with the absorption cell containing a gas with one strong absorption resonance in the region of interest. The relative interferometer paths are tuned to obtain a reflectance peak as shown;

FIG. 4b shows the resonator mode lying within the profile of the reflectance peak caused by the absorbing resonance;

FIG. 5 illustrates a laser resonator which employs a grating used in Littrow for one of the reflecting elements. The other reflecting element is the near white light interferometer configuration of FIG. 4; FIG. 5a shows the resonance of the near white interferometer with the absorbing gas presenting several absorption lines;

FIGS. 6 and 6a show embodiments in which laser regeneration occurs in a ring configuration; FIG. 6 employs broad band reflecting mirrors, FIG. 6a shows the case where a grating element is used in the resonator;

FIG. 7 shows an embodiment in which the near white light interferometer with the absorption cell is used external of the laser. The laser is a pulsed gain-switched laser operating in the transient regime. The configuration shown causes unidirectional oscillation to occur on the resonator mode lying nearest to the interferometer narrow resonance peak (tuned to appear in reflection as in FIG. 2b or 4b);

FIG. 8 is another embodiment showing a gain-switched laser configuration in which unidirectional oscillation occurs on the mode nearest an absorbing resonance, as in FIG. 7;

FIG. 9 is a filter embodiment; the broad spectrum of an incident radiation is transmitted only in the spectral range lying within the profiles of selected absorbing resonances;

FIGS. 10, 10a, 10b, 10c refer to gas detection systems, employing synchronous detection. FIG. 10 and 10a give two different methods to switch the laser oscillation on and off the absorbing resonance. FIG. 10b is a transmitter receiver DIAL system (differential absorption lidar );

FIG. 11 is the diagram of a chemical reactor employing the laser with a resonator embodiment described in the disclosure.

DESCRIPTION OF THE INVENTION

The invention employs an optical interferometer, containing within it an absorption cell. The interferometer has an input and an output. A collimated light incident at the input can emerge from the output, or be reflected in a reverse direction.

Figure 1:
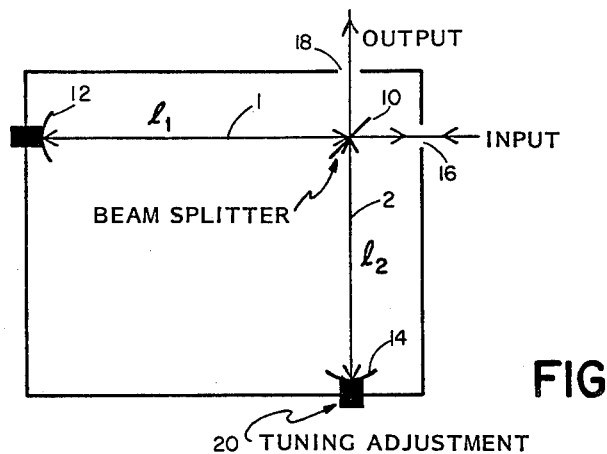
FIG. 1 is a diagram of a near white light Michelson interferometer.

In its simplest form, the interferometer can be a Michelson interferometer with an optical path near white light configuration; the absorption cell is placed within one of the interferometer arms. Let us first review the relevant properties of a white light interferometer (first without the absorption cell). Referring to FIG. 1, a light ray at a wavelength $\lambda$ is incident on a beam splitter 10 at the interferometer input. The split rays after propagating through the two interferometer arms, arms 1 and 2, and reflecting from mirrors 12, 14, see FIG. 1, reappear at the beam splitter as two interfering rays. The rays emerging from the input-side of the interferometer at 16 propagate in a reverse direction from the incident ray.

We refer to the resultant ray (the combined ray after interference) as the ray reflected from the interferometer. Similarly, we designate the resultant ray emerging at the interferometer output 18 as the transmitted ray.

Figure 1A:
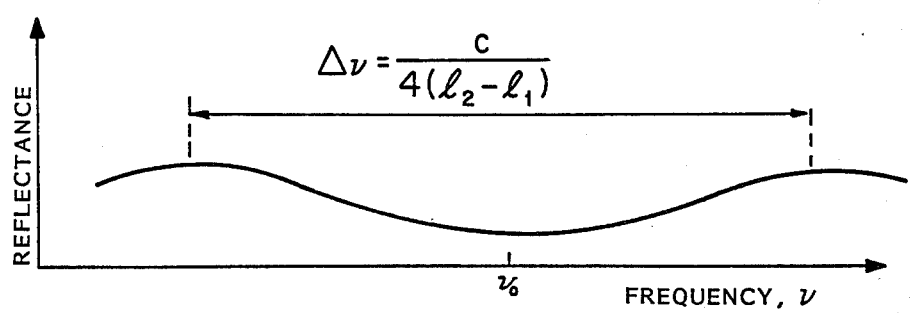
FIG. 1a shows the output of the interferometer of FIG. 1 versus frequency when the optical path is adjusted for the ray reflected from the interferometer(on the input side) to appear in destructive phase centered at $\nu_o$.
Figure 1B:
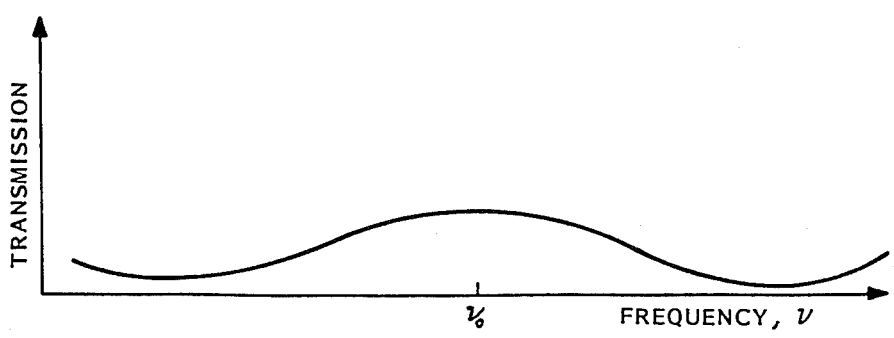
FIG. 1b is a similar diagram in which the optical path is adjusted for the transmitted wave to appear constructively in the region centered at $\nu_o$.

It is well known that the interferometer optical path may be adjusted by a tuning adjustment device 20 so that the rays at the output appear, e.g., destructively; in that case the interference effect at the input side of the interferometer will appear in a constructive phase. There will be a minimum transmitted and a maximum reflected ray . The situation will reverse if one of the interferometer path lengths is changed by $\lambda/4$; in that case the reflected ray will be at a minimum and the transmitted ray at its maximum, the condition represented by FIGS. 1a and 1b .

For arbitrary arm lengths, the enterference effect is sensitively dependent on the wavelength, $\lambda$, and apperars as a periodic function of $1/\lambda$. The amplitude of the transmitted or reflected waves, as is well known, are proportional to $$\cos\left(4\pi\frac{l_2-l_1}{\lambda}+\Phi_t\right) \text{ and } \cos\left(4\pi\frac{l_2-l_1}{\lambda}+\Phi_r\right)$$

respectively, with $$\Phi_t - \Phi_r = \frac{\pi}{2}.$$

The length parameters $l_1$ and $l_2$ represent single-pass optical lengths of arms 1 and 2 respectively. The maxima's of the transmitted ray (corresponding to the minima's of the reflected ray) will occur at $$\left(4\pi\frac{l_2-l_1}{\lambda}+\Phi_t\right) = n\pi,$$

with n as an integer.

As is seen, the interference becomes wavelength independent if $(l_2-l_1)=0$. This condition is known as the "white light" interference condition.

In our use of the effect, it will be sufficient to be near the white light condition; this permits, for convenience, $l_1$ to differ from $l_2$ by a small amount. Inspection shows that for $l_1$ different from $l_2$, the periodic dependence in frequency-scale will have a period given by $\Delta\nu_p=c/[4(l_2-l_1)]$, with c as the speed of light. Note that a change in the frequency of incident radiation $\nu=c/\lambda$, by an amount $\Delta\nu_p$, will shift one maximum to the next. We require fairly large $\Delta\nu_p$. For instance, for $l_2-l_1=1$ mm, $\Delta\nu p=\frac{3}{4}\times10^{11}$Hz, corresponding to 2.5 cm$^{-1}$. For $(l_2-l_1)=0.1$ mm, the period will be 25 cm$^{-1}$. Considerably larger $\Delta\nu_p$ can readily be obtained. In practice one can employ a variable arm interferometer; with final fine adjustments the path-difference can be reduced below a desired value.

We also note that if the interferometer is adjusted to show, e.g., a maximum at its output at a given wavelength, a change of its length by $\lambda/4$ will tune the output to a minimum.

Figure 2:
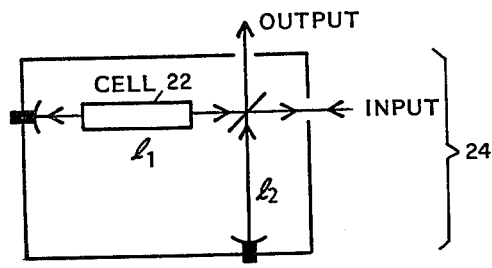
FIG. 2 is the near white light interferometer of FIG. 1 in which an absorption cell is introduced in one of the interferometer arms.

Consider an absorption cell 22 to be placed inside one of the interferometer arms, see FIG. 2. Assume the interferometer is adjusted to a near white light configuration without an absorbing gas in the absorption cell. Furthermore, assume the interferometer path-difference (without an absorbing gas) to be tuned so that the reflected wave is at a minimum for an incident ray at a frequency $\nu_o$; the frequency $\nu_o$ may be in the IR or optical region. As is seen, in the near white light configuration, the reflection at the input will remain small if $\nu_o$ is varied in a range appreciably below $\Delta\nu_p$; for near white light condition $\Delta\nu_p$ can be tens of $cm^{-1}$ or larger, as noted.

Figure 2A:
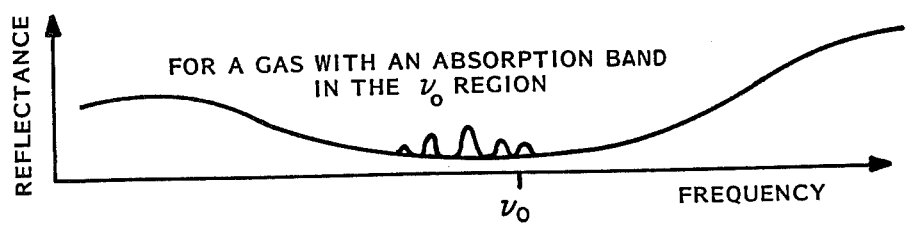
FIG. 2a shows the intensity of the rays reflected from the interferometer for the case where the interferometer arms are adjusted for a minimum reflection in the region $\nu_o$ with the absorbing gas presenting an absorption band in the $\nu_o$ region. The reflected wave shows narrow peaks as shown.

Let us introduce into the absorption cell a gaseous medium presenting one or several well resolved absorption resonances near $\nu_o$. In the spectral region outside of the absorption resonances, the interference process will be unaffected by the presence of the gas (at a low pressure) hence the reflectivity will remain at a minimum. At frequencies within the profile of an absorption resonance, however, the interference will be unbalanced, resulting in sharp resonant reflectance, see FIG. 2a. The sharp reflectance will have a narrow width determined by the narrow profile of the absorption resonance. Thus a new optical element 24 is defined.

In certain embodiments, it is advantageous to employ the interfering optical element described above at its transmitting configuration. In that case, the pathlength is adjusted for minimum transmission in the region overlapping $\nu_o$.

In the presence of the absorbing gas, see FIG. 3, there will be transmission at frequencies within the narrow profiles of the absorbing resonances, while it will remain a minimum outside of the absorption profiles.

The optical element 24, presenting the narrow reflectance or transmission peaks as described, is utilized in the invention as follows.

Consider first the near white light interfering optical structure 24 in its reflecting configuration (as in FIG. 2). The element can be used in place of one of the end mirrors of the resonator of a relatively high-gain laser, see FIG. 4. Laser 26, in standing wave configuration, has an optical cavity defined by optical element 24 and mirror 28, with a laser amplifying medium 30 disposed within the cavity. We assume, for the moment, the interferometer period $\Delta\nu_p$ to be tuned to a value larger than the laser amplifier gain bandwidth. The latter will be assumed to overlap the selected absorption resonances of interest. To simplify the description, consider a case where the absorbing gas presents only one strong absorption line in the region of interest, see FIG. 4a. The more general case where several lines or an absorption band are present will be described later.

It follows that such a laser resonator will have only a few high-Q resonances; the resonances lie within the profile of the absorption line where the interferometer element presents a peak reflectance. In fact, for a narrow absorption profile and depending on the laser resonator length, only one high-Q mode may be present. For the case where several modes lie within the narrow reflection profile, the mode $M_1$ nearest to the peak reflectance will have the highest-Q, FIG. 4b. In that case, the laser tends to oscillate on the highest Q mode (see below, Mode competition and Saturation Effect).

Consider now a more general case where the absorbing gas presents several absorption lines lying within the broad band-width of the amplifying transition, see FIG. 5a. In that case regeneration can take place at frequencies within the profiles of the several reflectance peaks caused by the absorption lines. In the presence of such a reflectance band (and with a broad-amplifier bandwidth overlapping the band, see FIG. 5a, oscillation build-up will occur in a way similar to a laser with a conventional resonator in which the amplifier bandwidth consists of well resolved narrow transitions belonging to an amplifying band (as in a low pressure $CO_2$ laser). In the latter case, and with a broad-band resonator (employing mirrors with a broad-band reflectance), laser oscillation occurs on the strongest line within the amplifying band. Similarly in our case, the oscillation will occur on the strongest absorbing resonance providing the highest resonant reflectivity in the high-gain region of the laser-amplifier bandwidth.

In a variety of applications, one requires the laser to oscillate on a strong absorption line of a molecular absorption band. In such applications any of the strong lines of a selected absorption band will be adequate. The embodiment described will accomplish this purpose.

There are other applications, however, where it will be important to obtain single-mode laser oscillation on a selected line from within an absorption band. The embodiment shown in FIG. 5, will accomplish this. In this case the laser resonator has a tunable grating 32. Although the laser amplifier band width is broad, the grating-tunable laser with the resonator (presenting the well resolved narrow reflectance peaks), will behave as does a line tunable narrow band width (low pressure) gas laser, e.g., a $CO_2$ laser at several torr pressure. As the grating is tuned to a selected reflectance peak, the oscillation will occur on the mode lying within the profile of that reflectance resonance.

As we have noted before, a conventional gratingtunable laser with a broad-band amplifying medium (such as a high pressure gain-switched $CO_2$ laser, or an excimer inert-gas halide UV laser), tuned to a frequency corresponding to the center of an absorbing line of interest, will show a multi-mode spectrum, covering a sizable range, considerably broader than the absorption width. In our case, however, once the grating is tuned to the center frequency of a selected reflectance peak, single mode oscillation is achieved at a near line-center frequency. Since the grating response is generally considerably broader than the width of the reflectance resonance, slight drift in the grating tuning mechanism will not shift the oscillation frequency outside of the absorption profile.

The interferometer beam splitter, see FIG. 1, determines the peak reflectance or transmission factor of the empty interferometer. A variety of operating parameters can be obtained by appropriate selection of the beam splitter reflectivity or transmission factor. With the absorption gas in the interferometer absorption-cell, the narrow reflectance or transmission peaks will have "contrasts" dependent on the beam splitter properties, and the size of the peak absorption across the cell. We define the "contrast" by the ratio of the peak reflectivity at the center frequency of an absorption line, to the reflectivity outside of the line.

A high contrast will not be necessarily essential in a host of applications. For instance, a laser at a moderate gain and with a broad-band amplifier will oscillate at a frequency where the reflectivity shows a narrow peak, even if the peak reflectivity is only ten or fifteen percent larger than the value outside of the resonant profile. This consideration gives added flexibility in the design.

Mode Competition

The radiative details of laser multimoding differ in a gain-switched pulsed laser operating in the transient regime, as compared to a steady-state (CW) laser. Consider the case where the resonator presents several modes lying within an absorption profile, where the interferometer shows a resonant reflectance peak. In a transient laser (as in a high-pressure gain-switched pulsed $CO_2$ laser, or an excimer inert-gas halide laser), if the Q of the central mode is larger than the adjacent modes by as much as even ten percent, single-mode operation will occur on that mode.

Other considerations are involved in a steady-state CW laser. For a homogeneously broadened amplifier bandwidth, the well-known effect of spatial hole-burning plays an important role in mode coupling. A traveling wave CW laser, e.g., will behave differently from a standing wave CW laser. In our case if several modes exist within the resonant reflectance peak, multimoding can be avoided, if necessary, in a way similar to a conventional CW laser with a homogeneously broadened narrow amplifying transition (with a line-width the same as the width of our reflectance peak). To emphasize the similarity we underline that, a broad homogeneously-broadened amplifying band in the presence of a narrow reflectance peak, behaves similarly to a narrow homogeneously-broadened resonance in the presence of a broad-band reflectance (as in a conventional resonator).

Saturation Effect

In the embodiments described, after the laser oscillation on-set, the absorbing molecules will be subjected to strong laser radiation resonantly interacting with the molecular absorption line. Depending on the relaxaton time constants and the nature of line broadening of the absorbing resonance subjected to the laser radiation, it is likely that molecular saturation may occur and must be considered.

In a pulsed gain switched laser operating in the transient regime, the mode-selection process occurs in the early build-up time, long before the laser amplitude builds up to a sizable value. Accordingly, the state of the absorbing gas in the interferometer determining the high-Q resonances, will be of importance only at the early build-up time; the field amplitude is too weak in the early build-up to cause saturation. By the time the intensity of the selected mode reaches a value to cause saturation of the absorbing resonances, it has developed sufficient intensity to inhibit (via mode competition) oscillation build-up on other modes. This will be true for a gain-switched laser with a short pulse-duration, less than the time necessary to reach the steady-state oscillation.

In a steady state laser, however, saturation of the absorbing molecules may become of importance. This effect can lead to periodic pulsation, as in a relaxation oscillator, or a mode-locking effect. To avoid such effects, molecular saturation may be inhibited. This can be achieved by well-known processes, such as introducing a buffer gas to cause line-broadening, or decreasing the relaxation time constants.

Other Embodiments

The interferometer element with the absorption cell adjusted to show transmission peaks as in FIG. 3, can be used in a ring laser. In this case, the ring laser will oscillate at the frequency of the strongest peak, FIG. 6, or the frequency of a selected peak, FIG. 6a.

In other embodiments, the optical element can be used to advantage external of a laser. FIG. 7 gives an example in which a gain-switched(transient) broadband laser is forced to oscillate at a single-mode, lying within the narrow profile of a selected absorption line. This is a grating tunable gain-switched ring laser tuned to the peak of an absorption line. As noted before, such a laser without the external element will oscillate multimode, spread over a broad internal. The embodiment shown employs element 24, the interferometer with the absorption cell,adjusted in its reflecting configuration. It is placed facing one of the ring laser outputs, so that a ray incident on it is either reflected in a reverse direction, or transmitted through it (depending on the frequency).

At the build-up time, laser oscillation on-set occurs initially on a large number of modes. However, a mode reflected by the interferometer element will be selectively favored by mode-competition effect in the laser amplifier; that mode will dominate as the build-up further evolves, inhibiting the rest of the modes. In this case the interferometer is subjected to laser radiation only at the very early build-up time, since the selected mode will build up in a unidirectional traveling wave in the direction opposite to the initial incident radiation on the interferometer. In this configuration the interferometer is only subjected to very weak radiation at the early build-up time; this weak radiation will cut itself out as the single-mode oscillation overwhelmingly evolves in the opposite direction. Note that the absorber gas in the interferometer is never subjected to the high intensities of the laser radiation occurring late in the build-up, hence saturation will not occur.

The situation is analogous to the role of a suppressor mirror, causing unidirectional traveling wave oscillation in a ring laser. In that case, a mirror is placed at one of the outputs of a ring laser, reversing the direction of an incident radiation at early build-up time. A suppressor mirror, however, is a broad-band reflector, causing unidirectional oscillation for all modes and without discrimination.

In the above embodiment, the threshold requirements for laser oscillation on-set are primarily determined by the high-reflectance of the ring laser resonator. In this case, the peak reflectance of the interferometer element with the absorption cell need not be high, since it is not a determining factor in the oscillation threshold. If the ray path in front of the interferometer is interrupted, the ring laser will oscillate multi-mode on both traveling waves. With the interferometer uninterrupted, unidirectional single mode oscillation will occur at the selected frequency.

The external configuration described can be combined with the ring laser configuration, as shown in FIG. 8. In this case also, unidirectional build-up will occur on the selected mode. The absorber gas is subjected to weak radiation only at the build-up time.

There exists a variety of applications requiring only a weak radiation lying within the profile of a given absorbing resonance. There exist strong broad-band light sources as in a glow-bar, or emission from a broad-band transition of a molecular system, or luminescence spectrum of a semiconductor across a band gap, as in light-emitting diodes (LED), the lead-salt pseudobinary alloys, and others. Such sources are non-laser light sources and convenient to use. The interferometer embodiment with the absorption cell can be employed as a narrow-band filter, to filter the broad spectrum of such sources, selecting only the spectral range lying within the band-width of an absorption profile. FIG. 9 shows an embodiment in which the interferometer element is used in transmission; the transmitted spectrum consists of the filtered spectrum lying within the line profiles of the absorbing resonances.

In applications where the invention is used to detect a trace gas in the atmosphere, or to probe a constituent gas in a vessel, it will be advantageous to operate a pulsed system where the laser is periodically switched on and off the frequency of an absorbing line. FIGS. 10 and 10a show such systems.

In the FIG. 10 embodiment the laser is a pulsed gain switched laser oscillator in a configuration as in FIG. 7, except two separate near white light interferometer elements with absorption cells, 24a, 24b, are used external of the ring laser oscillator as shown. A motor driven rotor 50 appropriately interrupts the paths of the two interferometers, so that when one is switched on the other is off and vice versa. The laser amplifier 30 is switched on in synchronism with the rotating motor at a time when the path of one or the other interferometer elements is open. The absorption cells 22a, 22b, of the two interferometer elements contain different gases with different absorption resonances, causing laser oscillation to switch between the two lines.

FIG. 10a is another embodiment. In this case the motor driven rotor 50 switches the ring laser from oscillation with the white light interferometer containing the selected absorption gas, to a conventional free running laser oscillator. In the conventional configuration the suppressor mirror, S, causes unidirectional travelling wave to occur at a multimode and centered at a frequency determined by the grating element 32.

A synchronous detection system can be used, as in a DIAL system, to obtain increased detection sensitivity by narrow banding the receiver system.

FIG. 10b is a gas detector system with a synchronous receiver.

Figure 10C:
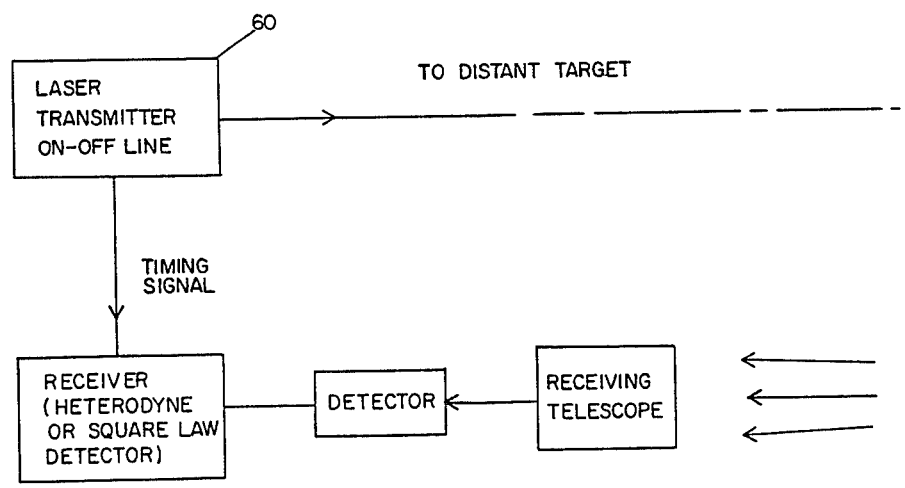

FIG. 10c is a remote receiving transmitter, receiver DIAL System (differential absorption lidar). The receiver can be a heterodyne or square law detector.

Different application areas for the invention are laser chemistry, isotope enrichment, or gas purification. In such applications, a laser at a frequency in coincidence with a molecular or atomic resonance is used to cause intense excitation to a high lying state. The high lying state can be a dissociative state or ionized product. In a laser-initiated reaction, the excited molecule undergoes a reaction with an unexcited molecule, producing an end product which can be filtered or separated by a conventional chemical method. As is well known, a reaction can in some cases be accompanied by a chain, with one excited molecule causing a sequence of reactions. In gas purification or isotope enrichment, molecules (or atoms) of given species are relatively excited (or ionized) by a laser.

FIG. 11 shows a diagram of a chemical reactor employing the laser with the embodiments as described in the present invention.

While the Michelson interferometer configuration has been used in the example, the other interferometer configurations can be employed. In suitable embodiments the absorption medium within the optical element can be employed in any of the physical states, gas, solid or liquid, so long as it is essentially transparent. Reflective losses from a cell can be minimized by use of Brewster windows or antireflective coatings as suggested in the figures.

The absorbing media will of course be varied according to the task. For atmospheric remote sensing one may use, e.g., methane, oxides of nitrogen and fluorocarbons. For process control and near range gas detection samples of the gases of interest, e.g. carbon monoxide, are employed as the absorbing media.

Laser chemistry using the wavelength determination methods of the invention include the numerous photodissociation, photoionization and laser induced reactions that are described in the public literature. These include, e.g. photochemistry of formaldehyde, used, e.g., with isotope selectivity for carbon 13 enrichment; photodissociation of $SF_6$ or $SO_2$; and photoionization of sulfur or uranium in a multistep process for separation or enrichment.

What is claimed is:

1. An apparatus for producing radiation at a narrow frequency corresponding to a prescribed absorbing resonance, comprising, a laser including a resonator cavity, an active laser medium within said cavity, laser pumping means and means to extract energy from said cavity, an optical assembly having interfering optical paths, said assembly including beam splitting and recombining means for splitting a beam and for subsequently recombining the split beam thereby to provide transmitted and reflected rays, and an absorption medium located in one of said interfering optical paths, molecules of said absorption medium having at least one absorption resonance with a characteristically narrow absorption profile in a region of desired laser oscillation, said optical paths being of substantially equal length whereby near white light interference occurs except for radiation in another of said optical paths lying at frequencies within said narrow profile of said absorption resonance because of the presence of said absorption medium, said laser together with said optical assembly being arranged to introduce said radiation within said narrow profile into said resonator cavity of said laser during initial oscillation build up time and to cause laser oscillation to occur in a mode lying within said narrow profile while modes lying outside of said profile are inhibited.

2. The apparatus of claim 1 wherein said absorption medium is arranged to provide said radiation within said profile in said reflected rays, said optical assembly being arranged to serve as a reflective element of the resonator cavity of said laser.

3. The apparatus of claim 1 wherein said absorption medium is arranged to provide said radiation within said profile in said trasmitted rays, said optical assembly being arranged to serve as a transmitting element of a resonator cavity of a ring laser.

4. The apparatus of claim 1 wherein said absorption medium is located external of the resonator cavity of said laser and said optical assembly is arranged to introduce said rays within said profile peak into the resonator cavity of said laser to cause laser oscillation to occur in said mode lying within said absorption profile.

5. The apparatus of claim 1 wherein said laser is a gain switched laser system constructed to operate in a pulsed transient regime.

6. The apparatus of claim 1, 2, 3, 4 or 5 in combination with means to transmit the laser output to a space containing an absorbing gas having an absorption resonance corresponding to a frequency in said narrow provide.

7. The apparatus of claim 6 including a detector means for detecting said laser output after interaction of said output with said absorbing gas, in said space whereby the presence of said gas in said space may be detected.

8. The apparatus of claim 7 in combination with laser transmitter probing optics for transmitting said output to probe trace gases in a remote space and a return signal receiver system for receiving a return signal after interaction of said output with said absorbing gas.

9. The apparatus of claim 7 including means to periodically switch laser oscillation on and off the absorption resonance of said gas being detected to form a differential absorption lidar system.

10. The apparatus of claim 6 wherein said space is defined by a reactor vessel and said laser output is arranged to energize selected molecules in said reactor vessel to an excited state to provide a change in the molecular properties.

11. An optical assembly comprising: means defining interfering optical paths in which a propagating beam is split and subsequently recombined to provide transmitted and reflected rays, an absorption medium located in one of said paths, molecules of comprising said absorption medium having at least one absorption resonance with a characteristically narrow absorption profile in a region of desired radiation, said optical paths being of substantially equal length whereby near white light interference occurs in region except for radiation in another of said optical paths lying at frequencies within said narrow profile, because of the presence of said absorption medium, whereby said optical assembly when illuminated by a relatively broad band source produces radiation corresponding to said narrow profile 12. A method for producing radiation at a narrow frequency corresponding to a prescribed absorbing resonance, comprising, providing a laser including a resonator cavity, an active laser medium within said cavity, laser pumping means and means to extract energy from said cavity, defining within an optical assembly interfering optical paths in which a propagating beam is split, and subsequently recombined to provide transmitted and reflected rays, and locating an absorption medium in one of said interfering optical paths, molecules of said absorption medium having at least one absorption resonance with a characteristically narrow absorption profile in a region of desired laser oscillation, causing said optical paths to be of substantially equal length whereby near white light interference occurs except for radiation in another of said optical paths lying at frequencies within said narrow profile of said absorption resonance because of the presence of said absorption medium, and employing the wave of said optical assembly that contains said frequencies to cause said laser to oscillate in a resonator mode lying within said narrow profile, while resonator modes lying outside of said narrow profile are inhibited, and transmitting the laser output to a space containing an absorbing gas having an absorption resonance corresponding to said profile, said space being defined by a reactor vessel and said laser output energizing selected molecules in said reactor vessel to an excited state to provide a change in the properties of said molecules 13. The method of claim 12 comprising employing said laser output to cause said change in the molecular properties by photo dissociation of said molecules.

14. The method of claim 12 comprising employing said laser output to cause said change in the molecular properties in a manner to cause chemical reaction of energized molecules with other molecules present in said reactor.

* * * * *

UNITED STATES PATENT OFFICE
CERTIFICATE OF CORRECTION

Patent No. 4,435,808        Dated   March 6, 1984

Inventor(s)   Ali Javan

It is certified that error appears in the above-identified patent and that said Letters Patent are hereby corrected as shown below:

Col. 6, line 16, "interference" is misspelled;
    same line, "appears" is misspelled;

Col. 8, line 29, "gratingtunable" should be
    --grating-tunable--;

Col. 12, line 66, "provide" should be --profile--;

Col. 13, line 23, delete "comprising";

Col. 13, line 28, "in region" should be --in said region--.

Signed and Sealed this

Twenty-seventh Day of November 1984

[SEAL]

Attest:

GERALD J. MOSSINGHOFF

Attesting Officer        Commissioner of Patents and Trademarks